(12) United States Patent (10) Patent No.: US 9,992,986 B2
Nichols (45) Date of Patent: Jun. 12, 2018

(54) FISHING LIGHT FLOAT

(71) Applicant: Tracy E. Nichols, Dayton, KY (US)

(72) Inventor: Tracy E. Nichols, Dayton, KY (US)

( * ) Notice: Subject to any disclaimer, the term of this patent is extended or adjusted under 35 U.S.C. 154(b) by 0 days. days.

(21) Appl. No.: 14/757,202

(22) Filed: Dec. 3, 2015

(65) Prior Publication Data

US 2017/0027147 A1    Feb. 2, 2017

Related U.S. Application Data

(60) Provisional application No. 62/123,941, filed on Dec. 3, 2014.

(51) Int. Cl.
*A01K 93/00* (2006.01)
*A01K 93/02* (2006.01)

(52) U.S. Cl.
CPC .............. *A01K 93/00* (2013.01); *A01K 93/02* (2013.01)

(58) Field of Classification Search
CPC ........ A01K 85/00; A01K 85/01; A01K 85/18; A01K 91/03; A01K 93/00; A01K 93/02; A01K 97/12; A01K 97/125
USPC ............ 43/17, 17.5, 17.6, 43.1, 44.87, 44.9, 43/44.91
See application file for complete search history.

(56) References Cited

U.S. PATENT DOCUMENTS

| 3,381,407 | A | * | 5/1968 | McDougall | ............ A01K 93/00 43/44.88 |
|---|---|---|---|---|---|
| 3,798,822 | A | | 3/1974 | Lampus | |
| 4,505,063 | A | | 3/1985 | Price et al. | |
| 5,199,205 | A | | 4/1993 | Klammer | |
| 5,274,945 | A | * | 1/1994 | Ross | ...................... A01K 93/02 43/17.5 |
| 5,826,366 | A | | 10/1998 | Matibe | |
| 5,852,894 | A | | 12/1998 | Shannon et al. | |
| 6,122,853 | A | | 9/2000 | Genous-Moore | |
| 6,226,917 | B1 | | 5/2001 | Sylla et al. | |
| 6,425,200 | B1 | | 7/2002 | Bennis | |
| 6,966,139 | B2 | | 11/2005 | Izzard | |
| 8,104,220 | B2 | | 1/2012 | Cobb | |
| 8,161,678 | B1 | | 4/2012 | DeLucca | |
| 8,365,459 | B2 | | 2/2013 | Bennis | |
| 8,505,232 | B2 | * | 8/2013 | Reynolds | ............... A01K 93/00 43/17.5 |
| 2004/0237376 | A1 | * | 12/2004 | Holmes | .................. A01K 93/00 43/44.9 |
| 2006/0075675 | A1 | | 4/2006 | Goretti et al. | |

(Continued)

*Primary Examiner* — Darren W Ark
*Assistant Examiner* — Brady W Frazier
(74) *Attorney, Agent, or Firm* — Carrithers Law Office PLLC

(57) ABSTRACT

A fisherman's float including a hollow longitudinal body with a bulb at each end. Each of the bulbs is hollow. The two bulbs are connected by a tube which passes through each bulb. The first bulb contains two threaded halves which can be un-threaded from one another. The fishing line passes through the bulb, the longitudinal body and the two part float and then on to a second float (if desired), a sinker (if desired) and a hook and/or bait. The two halves of the two part bulb screw together so that a light source, electrically or chemically driven, can be inserted and held in the water tight float. Each one of the bulbs floats. The longitudinal body is preferably eight to twelve inches long and serves to prevent tangles as well as to increase the visibility of the float and easy detection of fish activity at the bait.

14 Claims, 2 Drawing Sheets

(56) References Cited

U.S. PATENT DOCUMENTS

| | | | |
|---|---|---|---|
| 2006/0185216 A1* | 8/2006 | Bogess | A01K 93/02 |
| | | | 43/17.5 |
| 2006/0283074 A1* | 12/2006 | Barrow | A01K 93/02 |
| | | | 43/44.87 |
| 2006/0288633 A1 | 12/2006 | Fiferlick | |
| 2008/0250696 A1* | 10/2008 | Brasseur | A01K 91/08 |
| | | | 43/44.97 |
| 2010/0281757 A1 | 11/2010 | Bennis | |
| 2013/0014425 A1 | 1/2013 | Reynolds et al. | |

* cited by examiner

FISHING LIGHT FLOAT

CROSS REFERENCES TO RELATED APPLICATIONS

This application claims priority from U.S. Provisional Application Ser. No. 62/123,941 filed on Dec. 3, 2014 which is incorporated by reference herein in its entirety.

TECHNICAL FIELD

The present invention relates to the field of fisherman's float or bobbers' connected to the fishing line above the bait and used to detect the likelihood of having a fish nibbling or caught on the hook.

BACKGROUND OF THE INVENTION

Fishing floats or 'bobbers' are commonly used to establish and maintain the depth at which a bait or lure is held while fishing and to visually inform the fisherman that a fish is taking or has taken the bait. When there is no fish touching the bait, the float is motionless but when a fish is in the process of taking the bait, the float may move slightly or drastically, depending on how hard the fish is biting. The float may even be pulled under the surface of the water. Floats of various sizes, shapes, and colors are used depending on fishing conditions and upon the desires of the user. Especially in situations where a user may use two or more fishing poles at the same time or in crowded conditions where there are nearby fisherman, a float is use in indicating where ones bait is and thereby establishing a zone which should be avoided when casting other baits to a nearby area. A highly visible float is desirable.

Some floats are available which include light sources of various types for night time fishing. Such light sources are typically either chemically driven (for example . . . 'glow sticks') or electrically driven by battery.

Common problem encountered when casting a bait with a sinker and a float is that the portion of the fishing line below the float can become entangled with the line above the float. Sometimes, because the float and bait have been cast a long distance from the fisherman, a tangled line may not be visible to the fisherman. In this event, the fisherman has cast his bait and is under the impression that the bait is available to the fish at the depth set by the float. However, due to the tangled line, the bait is not at the correct depth and may even be wrapped around the float and totally invisible or unavailable to a fish. Worse, if the fisherman sees his float, but is unaware of a tangled line, he may think everything is okay and leave the tangled bait unavailable to fish for an extended period of time, thus missing out on any opportunity to catch of fish for that entire period of time.

DESCRIPTION OF THE RELATED ART

US Patent Application Publication No 20060185216 for LIGHT STICK HOLDING DEVICE FOR A FISHING FLOAT by Bogess which published on Aug. 24, 2006 teaches a holder attachable onto or incorporable into a selected float which is configured to removably hold a 'light stick' for increasing the visibility of the float.

U.S. Pat. No. 8,505,232 for DUAL COLOR REVERSIBLE LIGHTED SLIP BOBBER by Reynolds et al. teaches a slip bobber including an ovoid body with two threaded halves which when threaded together form an airtight floating chamber. A hollow axial tube including two lengths of tubes which are held coaxially end to end inside the float chamber extends from each end of the float and provides passage for a fishing line through the float. The float contains a circuit board with a battery, circuit and switchable light source.

SUMMARY OF THE INVENTION

In accordance with the present invention, there is provided a fishing float comprising, consisting of, or consisting essentially of a longitudinal tube, with a bulb at each end with one of the bulbs containing a light source. The longitudinal tube has a length of eight to twelve inches. The tube passes through the primary axis of the first floating bulb with the first end of the tube extending less than one tenth of one inch out of the first floating bulb. The tube passes through a primary axis of the second floating bulb and extends one inch or less out of the second floating bulb. The second floating bulb has two separable bulb halves with the first of the bulb halves having male threads and the second of the bulb halves having female threads. The male threads are threadable into the female threads. The joining of the bulb halves is water tight at a threaded joint thereof and is water tight at junctions between the bulb halves and the longitudinal tube. The longitudinal tube has two pairs of parallel arms extending upward from a surface thereof. The two pairs of arms are located inside the two bulb halves and are capable of cooperatively engaging and removably holding the light source within the two bulb halves threaded together.

It is an object of this invention to provide a fisherman's float which includes a hollow longitudinal tube passing through two prolate ellipsoid, spherical, or combination thereof, floating chambers where one chamber is near one end of the tube and the other chamber is near the opposite end of the tube.

It is an object of this invention to provide a fisherman's float including a longitudinal tube and two round floating chambers wherein one of the round chambers includes two threaded hollow halves which when threaded together are air tight and able to float.

It is an object of this invention to provide a fisherman's float wherein the threaded floating chamber can be taken apart to insert a light source. The light source may be either electrically driven or chemically driven.

It is an object of this invention to provide a fisherman's float including a longitudinal tube and two floating chambers so that a fishing line maybe passed through the tube and tied or connected to the float to regulate the depth of the bait.

It is an object of this invention to provide a fisherman's float including a longitudinal tube and two floating chambers which may be used with another longitudinal float as desired to increase the visibility of the first float.

It is an object of the present invention to provide a bird tail fishing light float which may be used with a conventional longitudinal float to eliminate tangled fishing lines due to fishing swimming around a float and over the fishing line.

It is an object of the present invention to provide a bird tail fishing light float which may be used with a conventional longitudinal float to eliminate the need to cut the line in order to change bobbers from night to day when a light means can be removably inserted or removed from the float bulb of the present invention.

It is an object of the present invention to provide a bird tail fishing light float which may be used with a conventional longitudinal float without having to tape a light onto a bobber.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein.

DESCRIPTION OF THE PREFERRED EMBODIMENTS

Figure 1:
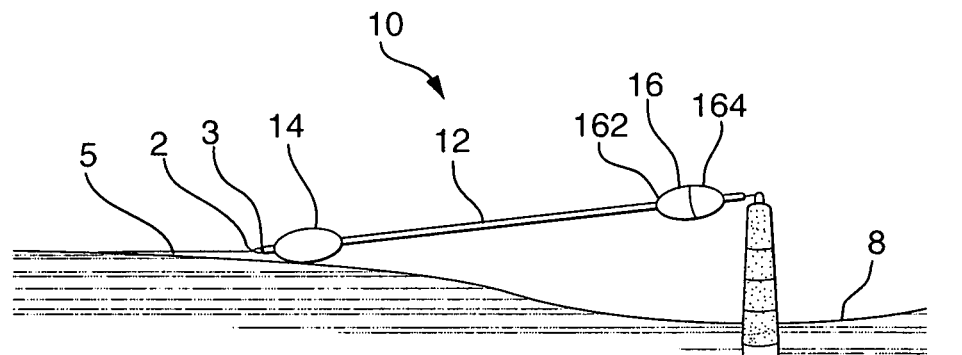
FIG. 1 is a side view of the lighted fishing float having a spherical float on a first distal end resting in the water connected by a longitudinal member to a transparent or translucent prolate ellipsoid bulb connecting a light source which is connected at an angle to the top of a common longitudinal float extending out of the water with the bottom of the float extending below the surface of the water with a sinker and a hook suspended from the float in the water at a selected depth.

In accordance with the present invention as shown in FIGS. 1-7, there is provided a fishing float 10 comprising or consisting of a longitudinal tube 12 which may be hollow passing through two floating chambers or bulbs 14 and 16. Floating chamber 14 is near or at one end of the longitudinal tube 12. Floating chamber 16 is at or near the opposite end of the longitudinal tube 12. The tube 12 is preferably eight to twelve inches long. The floating chambers 14 and 16 are preferably ovoid or oblong and are one to two inches in length and have a diameter of one-half to one inch. The tube 12 passes through the primary axis (longer axis) of the ovoid or oblong floats 14 and 16.

Alternative embodiments are longer than 12 inches. Preferred embodiments of the present invention are typically 6 to 14 inches long and include floating chambers which are round, circular prolate ellipsoid or even polygonal. Cross sections of alternative floating chambers are square, pentagonal, hexagonal or the like. Beads and/or rubber bands can be used to secure the bird tail fishing light float at a selected position on the line in close proximity to and prior to a longitudinal bobber which may also be secured by a bead, or split head sinker, or other bottle stop.

Figure 2:
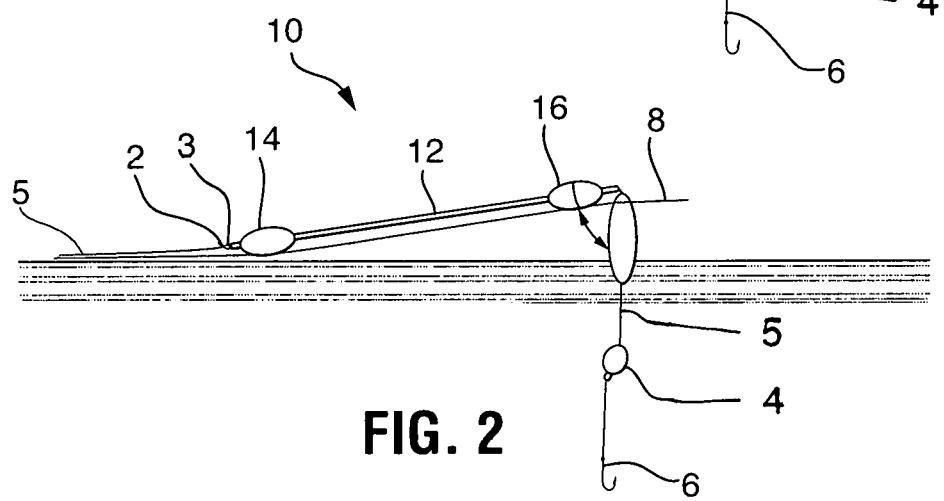
FIG. 2 is a side view of the lighted fishing float 10 of FIG. 1, showing the angle of the lighted bird tail and float with respect to the surface of the water.

FIG. 2 shows the fishing float 10 installed on a fishing line 5. Because the line freely slides through the longitudinal tube 12, the fishing float 10 functions as what is commonly called a 'slip float' which may include beads, knots or other stop means positioned at desired location to limit movement of the line through the float. Such a float is allowed some freedom of movement on the line but is limited or stopped by a bead 3 and a knotted piece of line 2 which is tied tightly around the line 5. When the fisherman casts the bait, momentum carries the float 10, the bait 6, the sinker 4 and the line 5 away from the fisherman. When the float 10, the bait 6, and the sinker 4 land on the water, the sinker 4 pulls the bait 6 downward until the bead 3 slides against the proximal end of the float 10. Because the knot 2 prevents the line 5 from sliding any further through the float 10, the sinker 4 and the bait 6 are now held at the selected desired depth.

Figure 3:
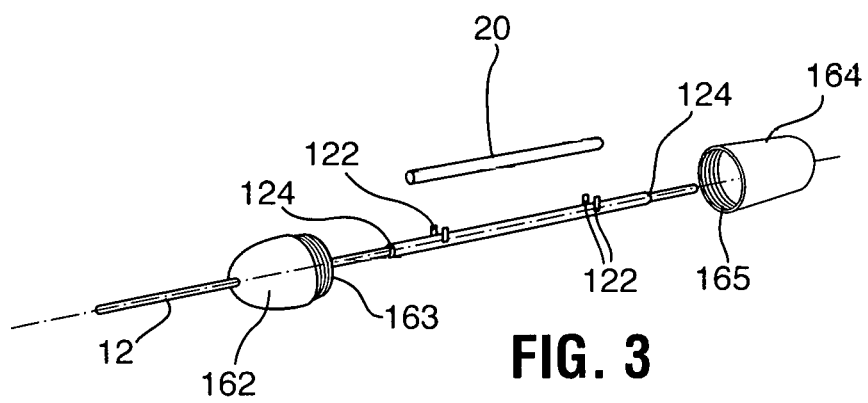
FIG. 3 is a front view of the threaded prolate ellipsoid bulb float chamber with an insertable chemically driven light source.

As shown in FIG. 3, floating chamber or bulb 16 includes two halves 162 and 164 in threaded engagement which can be unscrewed from one another permitting slidable movement of each half along the longitudinal member "tube" 12. Bulb half 162 has male threads 163 and bulb half 164 has cooperatively engaging female threads 165. When threaded together, the bulb halves 162 and 164 form an air tight chamber between each other and the tube 12 due to an interference fit between the tube 12 and the bulb halves 162 and 164. Another embodiment of the float 10 has o-rings 124 that provide an airtight connection between the bulb halves 162 and 164 and the tube 12.

When the two bulb halves 162 and 164 are un-threaded and slid apart, the chemically driven light source 20 can be activated and removably connected to the hollow tube or straw 12. Of course the tube 12 may be substantially solid so long as the longitudinal member includes a conduit which enables the fishing line to slide there through. As shown in one preferred embodiment, the tube has holding means comprising two sets of clamps or clasps 122 extending outward from the surface in parallel spaced apart alignment, configured for holding a cylindrical light source 20 (a chemically luminescent 'glow stick') or battery powered light which can be removably held by friction fit between the two pairs of clamps 122.

Figure 4:
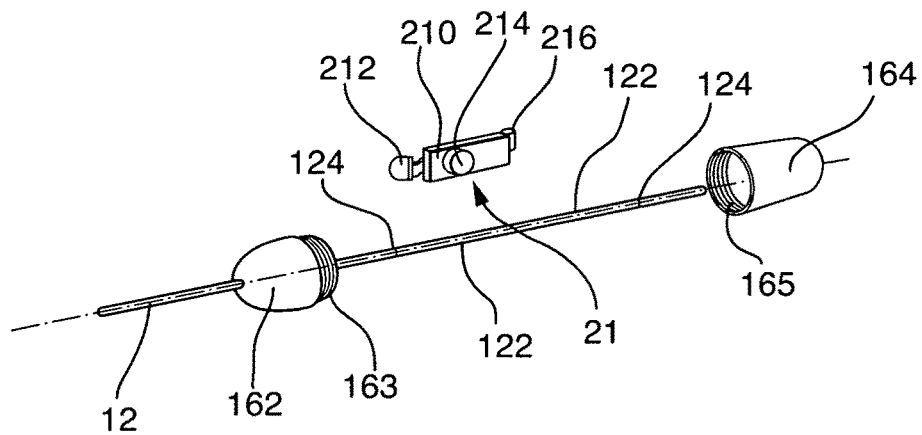
FIG. 4 is a front view of the threaded prolate ellipsoid bulb float chamber with an insertable electrically driven light source.

As shown in FIG. 4, the float 10 includes a battery driven electrical light 21 instead of a light stick or a chemically driven light. Light source 21 includes a printed circuit board 210, an LED 212, a battery 214 and a switch 216. The switch is used to turn the LED 212 on or off to save battery life while the float 10 is not in use.

Figure 5:
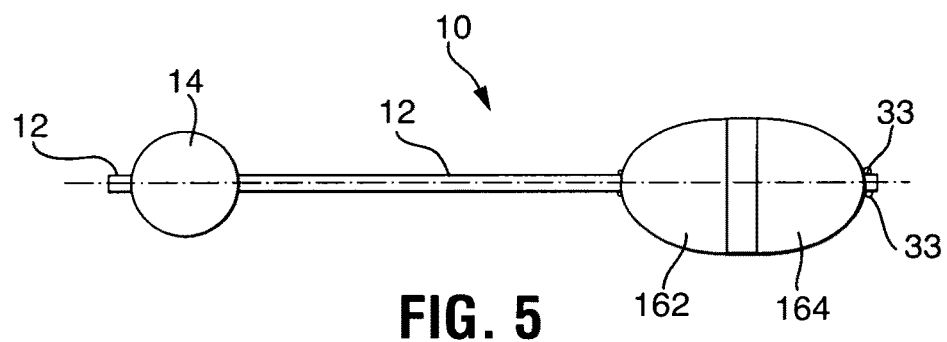
FIG. 5 is a side view of the present invention including a spherical float and a transparent prolate ellipsoid bulb.
Figure 6:
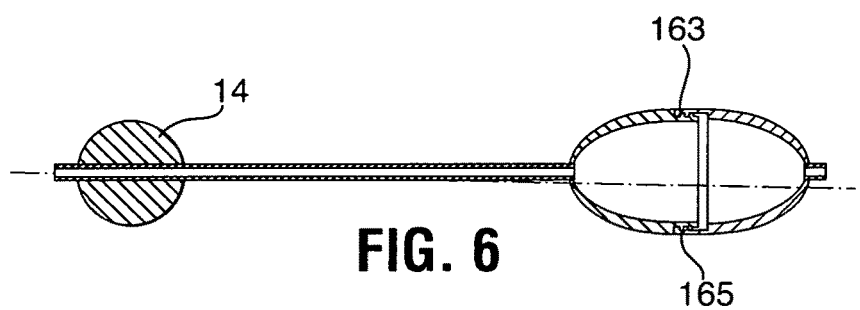
FIG. 6 is a sectional view of the float shown in FIG. 5, showing the threaded engagement of the ellipsoid bulb.
Figure 7:
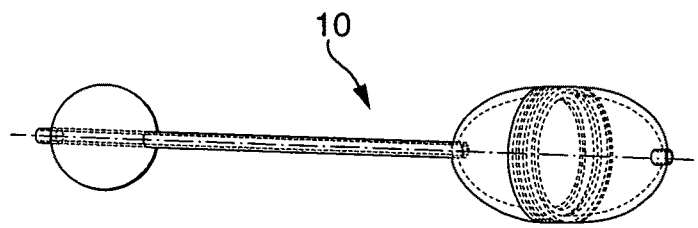
FIG. 7 is a perspective view of the float shown in FIGS. 5 and 6.

FIG. 5-7 show the use of a STYROFOAM ball as float 14. Also, a seal means 33 such as a gasket, glue, silicone, or other material may be used to aid in providing an air tight seal with the tube. In addition, the seal means may function as a holding means such as an o-ring or sealant at the junction of the distal end of the ellipsoidal bulb with the stick prevents the end of the bulb from falling off or sliding on the stick when the proximate portion of the bulb is unscrewed for insertion and removal of a light source.

It should be noted that a different method of setting the depth of the bait 6 from the float 10 can be utilized; however, this can lead to tangling of the line 5 around the float 10 during casting.

Using the light float 10 along with a common longitudinal float 7. Both float 10 and float 7 can be configured as slip floats. When the bait and the sinker have settled to the desired depth, the float 7 is partially pulled down in the water so that one half or more of the float 7 is below the water line 8. It can be seen that the bulb 16 and the distal end of the tube 12 is raised out of the water, but the bulb 14 is floating in the water. This approach makes the light bulb 16 more visible and small movements due to a fish 'nibbling' on the bait 6 are easier to see and lifting the line up and out of the water through the bird tail fishing light float at the point of connection with the longitudinal bobber prevents fish from becoming entangled in the fishing line dropping down from the top of the bobber. Typically the angle formed between the light float and longitudinal bobber is less than 130 degrees, more preferably from 80 to 110 degrees, and more preferably about 90 degrees.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

I claim:

1. A fishing light float comprising:
a longitudinal hollow tube of a selected length having a proximate end and a distal end;
a first floating bulb including an aperture formed in a top end and in a bottom end thereof cooperatively engaging said longitudinal hollow tube inserting through said top end and said bottom end with said longitudinal hollow tube passing through a primary axis of said first floating bulb, said proximate end of said longitudinal hollow tube extending a selected distance out of said first floating bulb;
a second floating bulb having a cavity therein, said second floating bulb comprising a light transmitting material, said second floating bulb including an aperture formed in a top end and in a bottom end thereof cooperatively engaging said longitudinal hollow tube extending through said top end and said bottom end, said longitudinal hollow tube extending through a primary axis of said second floating bulb, said distal end of said longitudinal hollow tube extending a selected distance out of said second floating bulb, said second floating bulb comprising a first bulb portion and a second bulb portion cooperatively engaged together forming a water tight seal at a joint therebetween, said second floating bulb forming a water tight seal at a junction between said longitudinal hollow tube and said aperture formed in said top end and in said bottom end of said second floating bulb;
a light source disposed within said cavity of said second floating bulb;
said longitudinal hollow tube having holding means extending therefrom for cooperatively engaging and removably holding said light source within said cavity of said second floating bulb;
and a longitudinal float having a top end in close proximity to and connecting to said distal end of said longitudinal hollow tube extending from a bottom end of said second floating bulb, wherein at least a portion of said second floating bulb and said bottom distal end of said longitudinal hollow tube and said top end of said longitudinal float extend out of the water at an angle.

2. The fishing light float defined in claim 1 wherein said light source is chemically driven.

3. The fishing light float defined in claim 1 wherein said light source is electrically driven.

4. A fishing light float comprising:
a longitudinal tube of a selected length having a proximate end and a distal end;
a first floating bulb with said tube passing through a primary axis of said first floating bulb, said proximate end of said tube extending less than one tenth of one inch out of said first floating bulb;
a second floating bulb having a cavity therein, said second floating bulb with said tube passing through a primary axis of said second floating bulb said distal end of said tube extending one inch or less out of said second floating bulb, said second floating bulb having a first bulb half and a second bulb half and means for cooperatively engaging said first bulb half and said second bulb half, a joining of said bulb halves being water tight at a threaded joint thereof and being water tight at junctions between said bulb halves and said longitudinal tube;
a light source comprising a chemical light stick disposed within said cavity of said second floating bulb;
said longitudinal tube having two pairs of parallel arms extending upward from a surface thereof, said two pairs of arms located inside said two bulb halves, said two pairs of arms capable of cooperatively engaging and removably holding said light source within said two bulb halves threaded together;
and a longitudinal float having a top end in close proximity to and connecting to said distal end of said longitudinal hollow tube extending from a bottom end of said second floating bulb, wherein at least a portion of said second floating bulb and said bottom distal end of said longitudinal hollow tube and said top end of said longitudinal float extend out of the water at an angle.

5. The fishing light float of claim 4, wherein said first bulb half includes a proximate open end having a slightly smaller diameter than an overlapping proximate end of said second bulb half and said means for cooperatively engaging comprises a friction fit there between.

6. The fishing light float of claim 1, wherein said a first bulb portion and a second bulb portion of said second floating bulb are cooperatively engaged together in threaded engagement.

7. The fishing light float of claim 1, said light transmitting material selected from the group consisting of a translucent material, a transparent material, and combinations thereof.

8. The fishing light float of claim 2, wherein said light source is a chemically luminescent glow stick.

9. The fishing light float defined in claim 3, wherein said light source is a battery powered light.

10. The fishing light float defined in claim 1, wherein said first floating bulb comprises a styrofoam material.

11. The fishing light float of claim 1, including means of sealing disposed between said longitudinal hollow tube and said second floating bulb.

12. A fishing light float comprising:
a longitudinal hollow tube of a selected length having a proximate end and a distal end;
a first floating bulb including an aperture formed in a top end and in a bottom end thereof cooperatively engaging said longitudinal hollow tube inserting through said top end and said bottom end with said longitudinal hollow tube passing through a primary axis of said first floating bulb, said proximate end of said longitudinal hollow tube extending a selected distance out of said first floating bulb;
a second floating bulb having a cavity therein, said second floating bulb comprising a light transmitting material, said second floating bulb including an aperture formed in a top end and in a bottom end thereof cooperatively engaging said longitudinal hollow tube extending through said top end and said bottom end, said longitudinal hollow tube extending through a primary axis of said second floating bulb, said distal end of said longitudinal hollow tube extending a selected distance out of said second floating bulb, said second floating bulb comprising a first bulb portion and a second bulb portion each having a cooperatively engageable open end for threadable engagement together forming a water tight seal at a joint therebetween, said second floating bulb forming a water tight seal at a junction between said aperture formed in said top end and in said bottom end thereof and said longitudinal hollow tube;

a light source disposed within said cavity of said second floating bulb supported by a least a pair of arms extending outward from said longitudinal hollow tube for holding said light source within said cavity of said second floating bulb;

and a longitudinal float having a top end in close proximity to and connecting to said distal end of said longitudinal hollow tube extending from a bottom end of said second floating bulb, wherein at least a portion of said second floating bulb and said bottom distal end of said longitudinal hollow tube and said top end of said longitudinal float extend out of the water at an angle.

13. The fishing light float of claim 12, said light source selected from the group consisting of a translucent material, a transparent material, and combinations thereof.

14. The fishing light float of claim 12, wherein said light source is a chemically luminescent glow stick.

* * * * *